US009280566B2

(12) United States Patent
Versteeg et al.

(10) Patent No.: US 9,280,566 B2
(45) Date of Patent: Mar. 8, 2016

(54) SYSTEM AND METHOD FOR VISUAL ROLE ENGINEERING

(71) Applicant: CA, Inc., Islandia, NY (US)

(72) Inventors: Steven C. Versteeg, Hawthorn (AU);
Avraham Rosenzweig, Netanya (IL);
Ron Marom, Givataim (IL)

(73) Assignee: CA, Inc., New York, NY (US)

( * ) Notice: Subject to any disclaimer, the term of this patent is extended or adjusted under 35 U.S.C. 154(b) by 572 days.

(21) Appl. No.: 13/668,107

(22) Filed: Nov. 2, 2012

(65) Prior Publication Data

US 2014/0129273 A1    May 8, 2014

(51) Int. Cl.
*G06F 17/30* (2006.01)
*G06F 21/62* (2013.01)
*G06F 21/60* (2013.01)
*G06F 9/44* (2006.01)
*G06Q 10/10* (2012.01)
*G06F 21/45* (2013.01)

(52) U.S. Cl.
CPC ........ *G06F 17/30286* (2013.01); *G06F 9/4433* (2013.01); *G06F 17/30115* (2013.01); *G06F 21/45* (2013.01); *G06F 21/604* (2013.01); *G06F 21/62* (2013.01); *G06F 21/6218* (2013.01); *G06F 21/6227* (2013.01); *G06Q 10/10* (2013.01)

(58) Field of Classification Search
CPC .......... G06F 21/6218; G06F 17/30286; G06F 21/604; G06F 2221/2141; G06F 9/4433; G06F 17/30115; G06Q 10/063112; G06Q 10/06; G06Q 10/10; G06Q 10/06311; G06Q 30/02

USPC .......... 707/781, 783, 784, 785, 786; 705/781, 705/7.14
See application file for complete search history.

(56) References Cited

U.S. PATENT DOCUMENTS

| | | | |
|---|---|---|---|
| 6,202,066 B1 * | 3/2001 | Barkley | G06F 21/6218 707/785 |
| 6,460,141 B1 * | 10/2002 | Olden | G06F 21/604 726/12 |
| 7,284,000 B2 | 10/2007 | Kuehr-McLaren et al. | |
| 7,703,033 B2 * | 4/2010 | Buchholz | G06F 21/6218 715/700 |
| 7,836,080 B2 * | 11/2010 | DeBie | G06F 21/604 707/785 |
| 8,055,680 B2 * | 11/2011 | Weeden | 707/785 |
| 8,321,461 B2 * | 11/2012 | Hinojosa et al. | 707/784 |
| 8,380,630 B2 * | 2/2013 | Felsher | 705/50 |
| 8,468,170 B2 * | 6/2013 | Bybee et al. | 707/793 |
| 8,745,087 B2 * | 6/2014 | Daily et al. | 707/781 |

(Continued)

OTHER PUBLICATIONS

Xiaowen Chu, Kai Ouyang, Hsiao Hwa Chen, Jiangchuan Liu and Yixin Jiang, Homonymous rols in role-based discretionary access control, Wiley InterScience, p. 1297-1298.*

(Continued)

*Primary Examiner* — Shahid Alam
*Assistant Examiner* — Andrew N Ho
(74) *Attorney, Agent, or Firm* — Coats & Bennett, PLLC

(57) ABSTRACT

The system and method of visual role engineering uses a visual assessment tool to identify clusters of users and to define roles. A "cluster image" is generated that visually depicts the cluster tendencies of users and permissions. An operator of the visual assessment tool can visually identify clusters of users with the same permissions. The operator may select a cluster representing a subset of users, define a role for the subset of users, and assign permissions to the role. The process may be repeated in an iterative fashion until it is determined that no more roles are needed.

20 Claims, 6 Drawing Sheets

(56) References Cited

U.S. PATENT DOCUMENTS

| | | | |
|---|---|---|---|
| 2005/0138419 A1 | 6/2005 | Gupta et al. | |
| 2005/0138420 A1 | 6/2005 | Sampathkumar et al. | |
| 2008/0271157 A1* | 10/2008 | Faitelson | G06F 21/6218 726/27 |
| 2009/0100058 A1* | 4/2009 | Faitelson | G06F 17/30587 |
| 2009/0119298 A1* | 5/2009 | Faitelson | G06F 21/604 |

OTHER PUBLICATIONS

Bezdek, J.C., et al., "VAT: a tool for visual assessment of (cluster) tendency." Neural Networks, 2002. Proceedings of the 2002 Joint International Conference on. IJCNN '02. pp. 2225-2230. May 2002. IEEE, Piscataway, NJ.

Ferraiolo, D., et al., "Role-Based Access Controls". 15th National Computer Security Conference, Oct. 13-16, 1992. Baltimore, MD. pp. 554-563. Accessed at http://csrc.nist.gov/groups/SNS/rbac/documents/ferraiolo-kuhn-92.pdf.

Zhang, D., et al., "RoleVAT: Visual Assessment of Practical Need for Role Based Access Control." Computer Security Applications Conference (ACSAC '09). Dec. 7-11, Honolulu, HI. Applied Computer Security Associates, Silver Spring, MD.

* cited by examiner

SYSTEM AND METHOD FOR VISUAL ROLE ENGINEERING

BACKGROUND

The present disclosure relates to computer systems, and more specifically, to systems and computer-implemented methods for role engineering.

Role Based Access Control (RBAC) is an access control model widely used to administer access permissions in large organizations. Generally, within an organization, different "roles" are created for different job functions. Each "role" is associated with a set of permissions that allow a person assigned to the role to perform those job functions. By way of example, a sales associate in a given organization may be assigned to a "sales" role that allows a person to perform sales functions and access sales-related data. Similarly, a software engineer and a project manager in the same organization may be assigned to an "engineer" role, and a "project manager" role, respectively. A department manager in charge of the people in these roles may be assigned to an "administrative" role that allows him/her to perform administrative functions, as well as multiple other roles as needed or desired.

Because RBAC ties the user access permissions to the roles rather than to an individual, the management of the individual user rights is greatly simplified. Particularly, such management becomes an exercise in ensuring that all users are assigned to the appropriate role. However, the most expensive phase of an RBAC implementation is the "role engineering" phase. This phase typically includes the identification and maintenance of the roles.

BRIEF SUMMARY

The present disclosure provides a method and apparatus for role engineering using a visual assessment tool to identify clusters of users and to define roles. The visual assessment tool creates and displays a "cluster image" that visually depicts the cluster tendencies of users and permissions. The role engineer can visually identify clusters of users with the same permissions. The role engineer may select a cluster representing a subset of users, define a role for the subset of users, and assign permissions to the role. The process may be repeated in an iterative fashion until it is determined that no more roles are needed.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
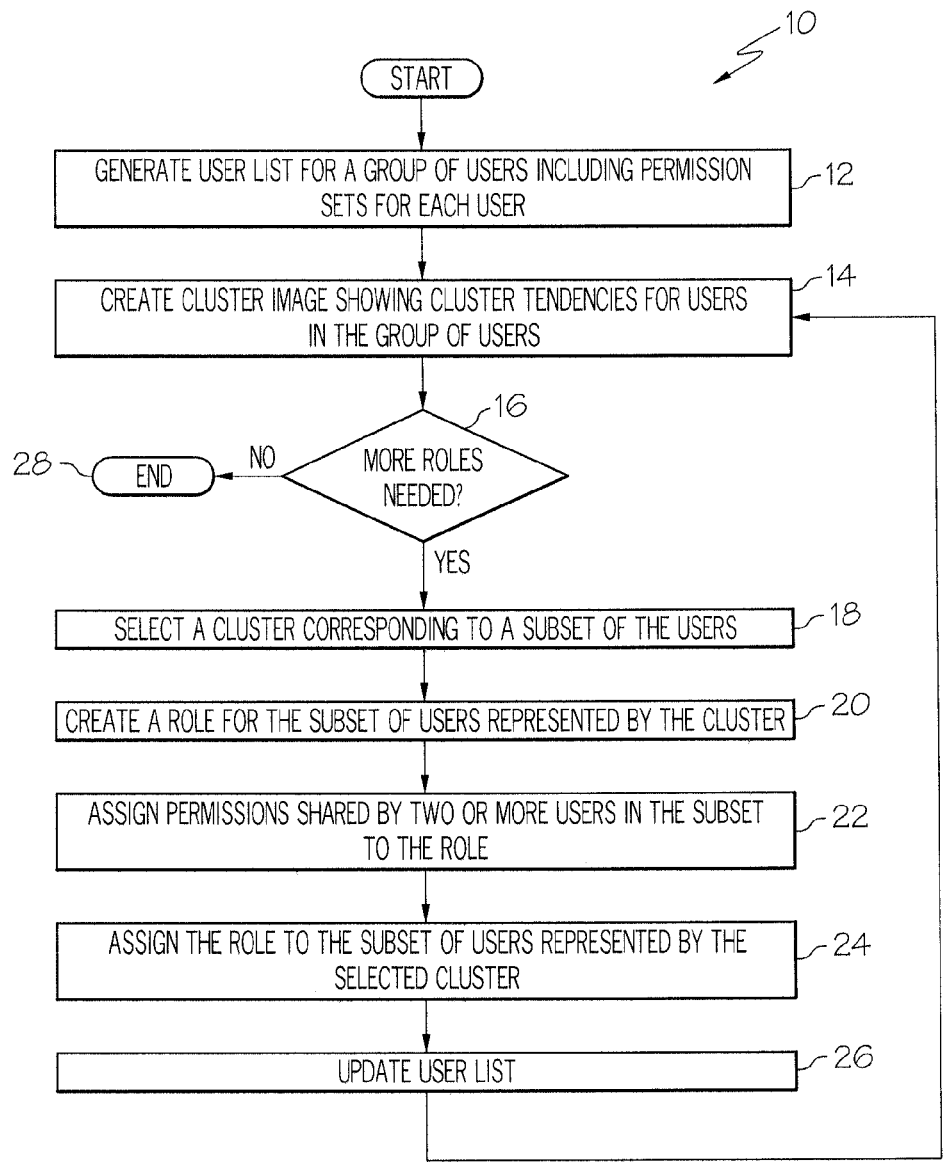
FIG. 1 is a flow chart illustrating a method according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a method and apparatus for role engineering using a visual assessment tool to identify clusters of users and to define roles. The visual assessment tool compares the permissions sets of the users in a group of users and creates a "cluster image" that visually depicts the cluster tendencies of users and permissions. The cluster image is displayed on a display so that the role engineer can easily identify clusters of users with the same permissions. The role engineer may select a cluster representing a subset of users, define a role for the subset of users, and assign permissions to the role. The process may be repeated in an iterative fashion until it is determined that no more roles are needed.

The cluster image may be created using a technique known as Visual Assessment of (cluster) Tendency (VAT). The Role-VAT algorithm is an extension of the VAT algorithm applied within the RBAC domain. In operation, RoleVAT calculates a dissimilarity matrix by comparing the permissions of each user in an organization to the permissions of all the other users in the organization. The dissimilarity matrix is then re-ordered using the VAT algorithm such that a human looking at an image generated based on the matrix can visually identify clusters of users with similar permissions. The RoleVAT algorithm is described in Dana Zhang, et. al., "RoleVAT: Visual Assessment of Practical Need for Role Based Access Control," presented at the 2009 Computer Security Applications Conference (ACSAC '09). This paper is incorporated herein by reference in its entirety.

Role engineering in accordance with the present disclosure provides benefits that conventional methods of role engineering do not provide. For example, the visual method of role engineering combines machine intelligence algorithms with human intelligence. Computer algorithms are used to visually present the access entitlement information in such a way as to allow a human to easily identify the roles that are affiliated with those permissions. Further, by visually representing all of the access entitlement patterns across the entire organization in a single image, it allows the role engineer to holistically select roles with the greatest administrative benefit in the context of the entire organization. This ability leads to a more accurate identification of roles during the role engineering process.

Additionally, the role engineer is able to visually assess the completeness of the RBAC implementation during the role engineering process as the RoleVAT image is iteratively updated when each new role is created. Moreover, by presenting large volumes of relevant information to the role engineer in a manner which can be intuitively understood and acted upon to create roles, the visual role engineering tool of the present disclosure shortens the time needed to perform the role engineering process.

Turning now to the figures, a method 10 of performing role engineering according to one embodiment is illustrated in FIG. 1. Method 10 begins with the creation of a user list including each user in a group of users and corresponding permissions sets assigned to each user (box 12). The list may, for example, comprise the identities or usernames of people in an organization. The permission sets for each user include one or more access control permissions that define the resources or services in a network that the user is permitted to access. As will be hereinafter described in more detail, the permission sets of the users are modified during the role engineering process so that the permission sets represent the non-covered permissions (i.e., permissions that are held by users and that have not been assigned to any role).

Figure 2A:
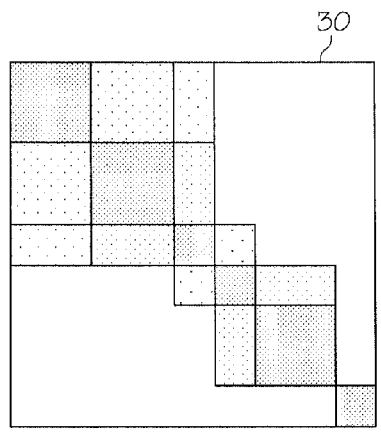
FIGS. 2A-2E illustrate a series of cluster images generated and displayed on a display according to one embodiment of the present disclosure.

The user list is input to a visual assessment tool that generates a "cluster image" (box 14). The visual assessment tool may be implemented by software running on a computing device. The cluster image visually depicts the cluster tendencies of the users based on their assigned permissions. FIG. 2A illustrates an exemplary cluster image 30 generated using the RoleVAT algorithm previously described. The shaded areas in the cluster image 30, referred to herein as clusters, represent subsets of the users within the group of users that have at least one permission in common.

The cluster image 30 is generated by comparing the permission sets for N users in the user list and generating an N×N dissimilarity matrix. A value representing the degree of similarity between the permission sets of two users is assigned to each matrix element in the dissimilarity matrix. The values assigned to the matrix elements are then used to generate a grey-scale cluster image comprising shaded blocks corresponding to each matrix element. The intensity of the shading indicates the degree of similarity between the permission sets of the users. In this example, increasing similarity is represented by increasingly darker shades of grey. Black matrix elements represent users with identical permission sets and white matrix elements represent users with no common permissions.

The cluster image is displayed to the role engineer on a display of the computing device. The role engineer can visually assess the cluster image and determine the need for additional roles (box 16). If additional roles are needed, the role engineer can select one or more clusters in the cluster image (box 18). As previously noted, each cluster represents a subset of users having at least one permission in common. The role engineer viewing the cluster image may employ a mouse or other user input device to select one or more clusters. Image analysis and edge detection algorithms can be employed to aid in the selection of a cluster.

For each selected cluster, the role engineer creates a role for the subset of users represented by the cluster (box 20). Permissions shared by two or more of the users in the subset are assigned to the role (box 22). In one embodiment, the assigned permissions are those that are shared by all users within the subset represented by the cluster, i.e., the intersection of the permissions for all users. In other embodiments, the role engineer may define a strictness threshold for assigning permissions. The strictness threshold specifies a percentage of users within the subset that must hold the permission in order for the permission to be assigned. For example, the role engineer my set the strictness threshold to 95% so that permissions held by at least 95% of the users in the subset will be assigned to the role. The created roles are then assigned to each person in the subset of users represented by the cluster (box 24).

After a new role is created, the user list is then updated to remove permissions that have been assigned to a role from the permission sets of the users represented by the selected cluster (box 26). It should be noted that deleting a permission from the permission set does not mean that the user no longer has the permission. The permission sets are used by the RoleVAT algorithm to keep track of the non-covered permissions during the role engineering process. In some embodiments, users with an empty permission set are deleted from the user list to create simple non-hierarchical role models. In other embodiments, the newly created role and its corresponding permission set may be added to the user list to create hierarchical role models as will be hereinafter described. In this case, users with assigned a single role and having an empty permission set are removed from the user list. The process may then be repeated until all permissions have been assigned, or until some other criterion is met. If the role engineer determines that no more roles are needed (box 16), the process ends (box 28). The role model created may then be passed to an enterprise workflow engine for approval.

FIGS. 2A-2E provide an illustrative example of visual role engineering method 10 to create a simple (non-hierarchical) role model. User permission data for this example is shown in Table 1. This user permission data, as stated above, is provided as input into a computing device used to perform the visual role engineering method 10.

TABLE 1

Users and Permission Sets

| Username | Permission Sets |
| --- | --- |
| Nancy (N) | engineering access, source code |
| Bill (B) | engineering access, source code |
| Rose (R) | engineering access, source code, budgets |
| Agnes (A) | sales, CRM |
| Jack (J) | sales, CRM |

TABLE 1-continued

Users and Permission Sets

| Username | Permission Sets |
| --- | --- |
| Charley (C) | sales, CRM, budgets |
| Oliver (O) | sales, CRM, analyst-reports, consulting |
| Edward (E) | sales, CRM, analyst-reports, consulting |
| Charlotte (CH) | administrator access |

Using the RoleVAT algorithm previously described, the following dissimilarity matrix is generated from the user list shown in Table 1:

|   | O | E | A | J | C | R | N | B | CH |
| --- | --- | --- | --- | --- | --- | --- | --- | --- | --- |
| O | 0.0 | 0.0 | 0.5 | 0.5 | 0.6 | 1.0 | 1.0 | 1.0 | 1.0 |
| E | 0.0 | 0.0 | 0.5 | 0.5 | 0.6 | 1.0 | 1.0 | 1.0 | 1.0 |
| A | 0.5 | 0.5 | 0.0 | 0.0 | 0.33 | 1.0 | 1.0 | 1.0 | 1.0 |
| J | 0.5 | 0.5 | 0.0 | 0.0 | 0.33 | 1.0 | 1.0 | 1.0 | 1.0 |
| C | 0.6 | 0.6 | 0.33 | 0.33 | 0.0 | 0.83 | 1.0 | 1.0 | 1.0 |
| R | 1.0 | 1.0 | 1.0 | 1.0 | 0.83 | 0.0 | 0.33 | 0.33 | 1.0 |
| N | 1.0 | 1.0 | 1.0 | 0.5 | 0.33 | 0.6 | 0.0 | 0.0 | 1.0 |
| B | 1.0 | 1.0 | 1.0 | 0.5 | 0.33 | 0.6 | 0.0 | 0.0 | 1.0 |
| CH | 1.0 | 1.0 | 1.0 | 1.0 | 1.0 | 1.0 | 1.0 | 1.0 | 0.0 |

The values assigned to the matrix elements represent the degree of similarity between two users, with 0 representing complete identity between user permissions and 1.0 representing no shared permissions. The cluster image 30 shown in FIG. 2A is generated from the dissimilarity matrix (FIG. 1, box 14). In the cluster image 30, each matrix element is represented by a shaded block. The intensity of the shading is determined by the value of the corresponding matrix element.

As seen in FIG. 2A, the shaded areas form clusters representing subsets of users in the group of users having at least one common permission. In this particular embodiment, a cluster comprises a group of contiguous shaded blocks that form a larger shaded block. A cluster may include shaded blocks with different shades of grey, but should not include any white blocks because a white block represents complete dissimilarity between permission sets for two users. The cluster image 30 provides the role engineer with a visual representation of the cluster tendencies of the users.

Figure 2B:
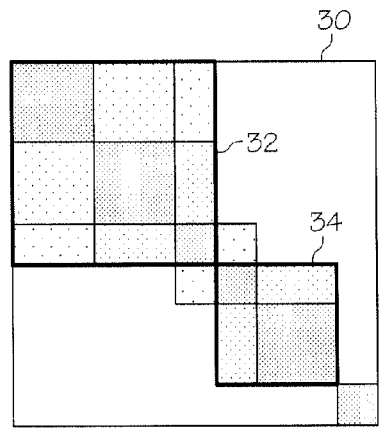
Figure 2C:
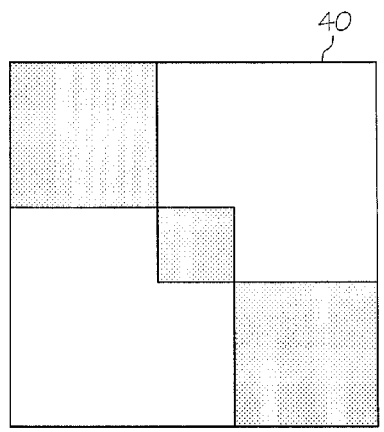

After the cluster image 30 is displayed, the role engineer selects one or more of the clusters (FIG. 1, box 18). FIG. 2B shows two selected clusters 32, 34, which may be highlighted on the display of the computing device to indicate the selection by the role engineer. As a general rule, it is desirable to select the largest non-overlapping clusters, as these represent the largest numbers of users having common permissions.

The roles for the selected clusters 32, 34 are then created and assigned to the users represented by the clusters 32, 34. In this example, cluster 32 represents Agnes, Jack, Charley, Oliver, and Edward while cluster 34 represents Nancy, Rose, and Bill. The role engineer creates a role for each subset of users represented by a selected cluster 32, 34, assigns permissions to the role, and assigns the role to the subset of users represented by the cluster 32, 34 (FIG. 1, boxes 20, 22, 24). In another embodiment, however, these functions are handled automatically by the computing device configured to implement the visual role engineering method of the present disclosure. For example, the device may be configured to create the role for each subset of users based on the role engineer's selection. Additionally, the device may calculate the permissions assigned to the role. By default, the permissions of the role are defined as the intersection of the permissions of all users in the selected group. However, if the role engineer defines or selects a strictness threshold, then the permissions will be those that are common to at least some portion (e.g. 95%) of the users in the selected group. Further, the device may automatically assign the created role to the appropriate users based on the cluster selected by the role engineer.

In general, the created role should bear some relation to the common permissions. In this example, two roles are created: sales and engineering. Table 2 below shows the permissions and users assigned to each role.

TABLE 2

Roles Created in First Iteration

| Role | Associated User(s) | Access Control Permission(s) |
|---|---|---|
| sales | Agnes, Jack, Charley, Oliver, Edward | sales, CRM |
| engineering | Nancy, Bill, Rose | engineering access, source code |

To complete the first iteration of the role engineering process, the user list is updated to reflect the new role assignments as previously stated (FIG. 1, box 26). More particularly, the permissions assigned to the newly created roles (e.g., sales, CRM, engineering access, and source code) are deleted from the permission sets of the users. Users with empty permission sets (i.e., Nancy Bill, Agnes, and Jack) are then removed from the user list. Table 3 below shows the revised user list.

TABLE 3

Revised User List After First Iteration

| Username | Access Control Permission(s) |
|---|---|
| Rose | budgets |
| Charley | budgets |
| Oliver | analyst-reports, consulting |
| Edward | analyst-reports, consulting |
| Charlotte | administrator access |

Figure 2D:
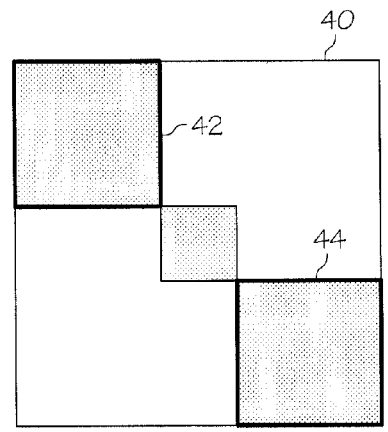

In this example, there are still non-covered permissions which have not yet been assigned to a role. The revised user list is used to generate a new cluster image 40 for the next iteration (FIG. 2C) (FIG. 1, box 14). Based on the cluster image 40, the role engineer determines that more roles need to be defined (FIG. 1, box 16). As previously described, the role engineer selects one or more clusters in the new cluster image (FIG. 1, box 18). FIG. 2D shows an exemplary selection of clusters 42 and 44. Cluster 42 represents the permissions shared by Rose and Charley, while cluster 44 represents the permissions shared by Oliver and Edward. Based on the selected clusters 42, 44, the role engineer defines two new roles: management and consultant (FIG. 1, box 20). Permissions are assigned to each new role (FIG. 1, box 22) and the role is assigned to each user in the subset represented by the cluster (FIG. 1, box 24). Table 4 below shows the permissions and users assigned to each role.

TABLE 4

Roles created after Second Iteration

| Role | Associated User(s) | Access Control Permission(s) |
|---|---|---|
| sales | Agnes, Jack, Charley, Oliver, Edward | sales, CRM |
| engineering | Nancy, Bill, Rose | engineering access, source code |
| management | Rose, Charley | budgets |
| consultant | Oliver, Edward | analyst-reports, consulting |

The user list is then updated to delete the permissions assigned to the management and consultant roles (i.e., budgets, analyst-reports, and consulting), and to remove users with empty permission sets (FIG. 1, box 26). Table 5 below shows the revised user list after the second iteration.

TABLE 5

User List After Second Iteration

| Username | Access Control Permission(s) |
|---|---|
| Charlotte | administrator access |

Figure 2E:
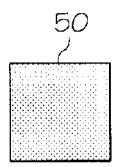
Figure 3:
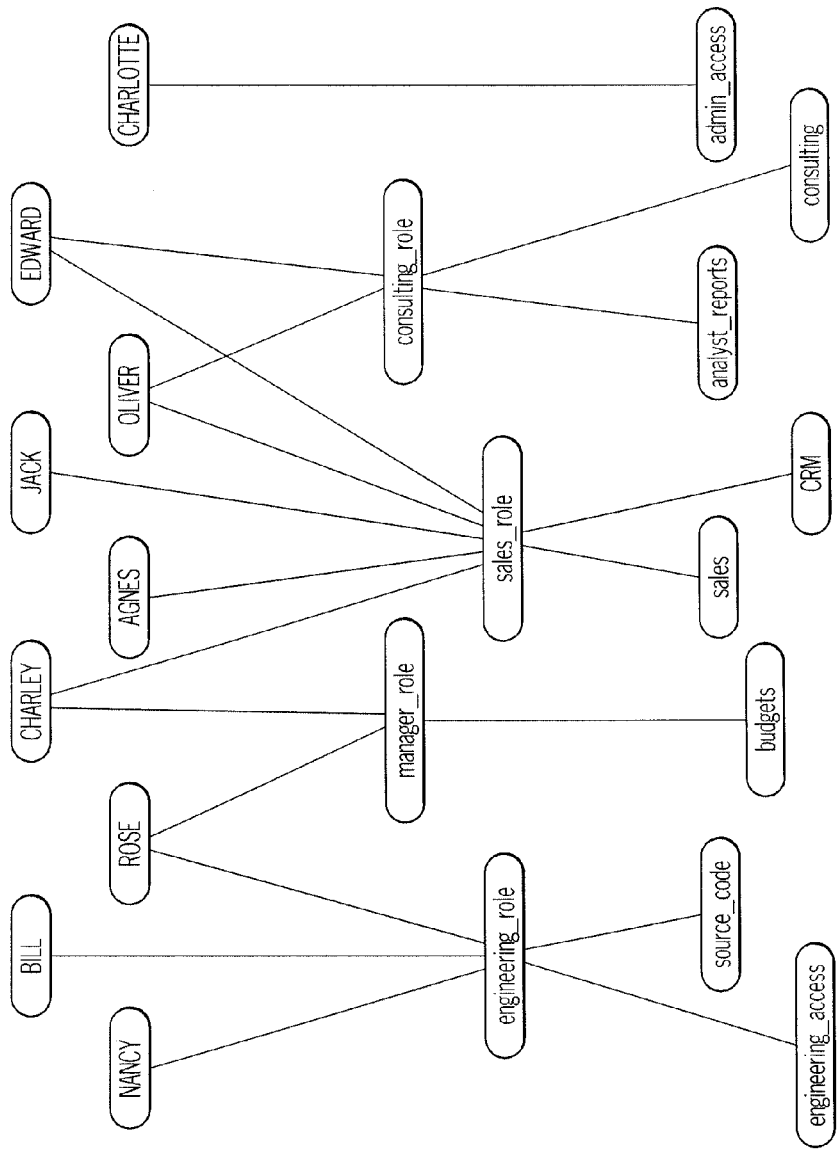
FIG. 3 illustrates a role model generated according to one embodiment of the present disclosure.

In this example, the user list after the second iteration comprises a single user with a single permission. The trivial cluster image 50 for the remaining user list is shown in FIG. 2E. At this point, the role engineer may determine that no new roles are needed and the process ends. Alternatively, the role engineer may create a role for the single remaining user and assign to it the permissions of the remaining user. The role model created may then be passed to an enterprise workflow engine for approval. FIG. 3 illustrates the role models defined by the role engineering process in this example.

In some embodiments of the invention, the role engineering process can be used to generate hierarchical role models. The role engineering process is generally the same with some modifications. The user list includes an additional column for roles assigned to users on the user list. Thus, one notable modification is that both roles and permissions are considered when creating the dissimilarity matrix (whereas in the embodiment of FIGS. 2A-2E only permissions were considered when creating the dissimilarity matrix). When the user list is revised at the end of each iteration of the role engineering process, the newly created role is added to the user list. Users are deleted from the user list when two conditions have been met: 1) the user has an empty permission set; and 2) the user has a single role. If the user has two or more roles, the user is not deleted even if their permission set is empty.

FIGS. 4A-4E provide an illustrative example of method 10 used to generate a hierarchical role model. The user permission data for the method is the same data used for the previous example and is provided in Table 1. As in the previous embodiment, the computing device utilizes the information in Table 1 to generate a cluster image 60 shown in FIG. 4A for display to the role engineer (FIG. 1, box 14). The cluster image 60 is the same as the cluster image 30 shown in FIG. 2A. The role engineer determines that additional roles are needed based on a visual assessment of the cluster image (FIG. 1, box 16). Therefore, the role engineer selects two clusters 62, 64 (FIG. 4B) (FIG. 1, box 18). The selected clusters 62, 64 are the same as the selected clusters 32, 34 in FIG. 2B. In this example, cluster 62 represents Agnes, Jack, Charley, Oliver, and Edward while cluster 64 represents Nancy, Rose, and Bill. The role engineer creates a role for each subset of users represented by a selected cluster 62, 64, assigns permission to the role, and assigns the role to the users represented by the cluster 62, 64 (FIG. 1, boxes 20, 22, 24). Table 6 below shows the permissions and users assigned to each role.

TABLE 6

Roles after First Iteration

| Role | Associated User(s) | Access Control Permission(s) |
|---|---|---|
| sales | Agnes, Jack, Charley, Oliver, Edward | sales, CRM |
| engineering | Nancy, Bill, Rose | engineering access, source code |

To this point, the role engineering process is the same as the previous example. However, this embodiment differs in how the user list is revised (FIG. 1, box 26). As previously described, the permissions assigned to the newly created roles are deleted from the permission sets of the users. In contrast to the previous example, the newly created roles are added the user list. Persons having a single role and an empty permission set (i.e., Bill, Nancy, Agnes, and Jack) are removed from the user list. Table 7 below shows the revised user list after the first iteration.

TABLE 7

Revised User List After First Iteration

| Username | Role | Access Control Permission(s) |
|---|---|---|
| Rose | engineering | budgets |
| Charley | sales | budgets |
| Oliver | sales | analyst-reports, consulting |
| Edward | sales | analyst-reports, consulting |
| Charlotte | — | administrator access |

In the next iteration, the new cluster image 70 is generated from the updated user list (FIG. 4C) (FIG. 1, box 14). The role engineer determines that additional roles are needed based on a visual assessment of the cluster image (FIG. 1, box 16). In this example, the role engineer selects clusters 72 and 74 (FIG. 4D) (FIG. 1, box 18). Cluster 72 represents the permissions shared by Rose and Charley, while cluster 74 represents the permissions shared by Oliver and Edward. Based on the selected clusters 72, 74, the role engineer defines two new roles: management and consultant (FIG. 1, box 20). Permissions are assigned to the new roles and the roles are assigned to the users represented by the cluster (FIG. 1, boxes 22, 24). Table 8 below shows the permissions and users assigned to each role.

TABLE 8

Defined Roles After Second Iteration

| Role | Associated User(s) | Associated Roles and Permissions |
|---|---|---|
| sales | Agnes, Jack, Charley, Oliver, Edward | sales, CRM |
| engineering | Nancy, Bill, Rose | engineering access, source code |
| management | Rose, Charley | budgets |
| consultant | Oliver, Edward | sales_role, analyst-reports, consulting |

It should be noted that in this example, all users assigned the sales role in the first iteration are also assigned the consultant role in the second iteration. In this case, the sales role is assigned to the consultant role, along with the other permissions. Thus, any user assigned the consultant role will also be assigned a sales role and receive the permission of the sale role.

The user list is then revised to delete the permissions assigned to the management and consultant roles (i.e., budgets, analyst-reports, and consulting), to remove users having a single role and empty permission sets (i.e., Oliver and Edward), and to add the newly defined roles (FIG. 1, box 26). Table 9 below shows the revised user list after the second iteration.

TABLE 9

Revised User List After Second Iteration

| Username | Role | Access Control Permission(s) |
|---|---|---|
| Rose | engineering, management | — |
| Charley | sales, management | — |
| Charlotte | — | administrator access |

Figure 4A:
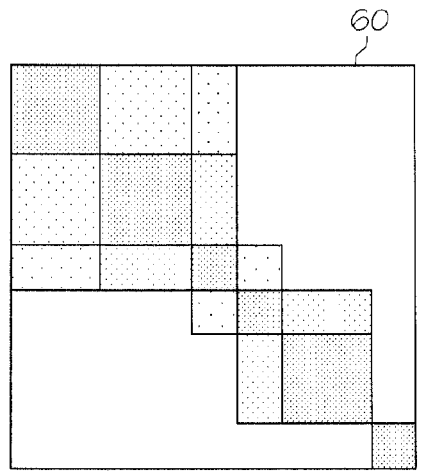
FIGS. 4A-4E illustrates a series of cluster images generated and displayed on a display according to one embodiment of the present disclosure.
Figure 4B:
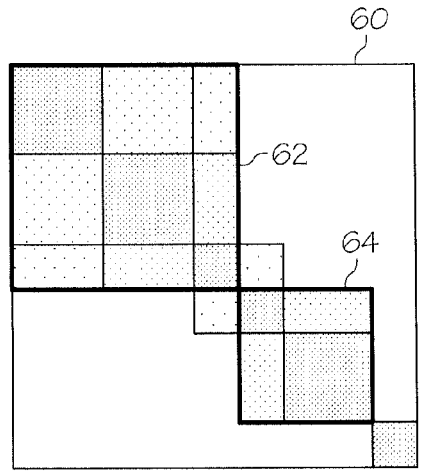
Figure 4C:
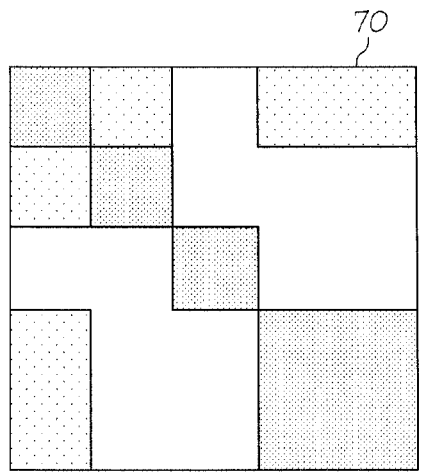
Figure 4D:
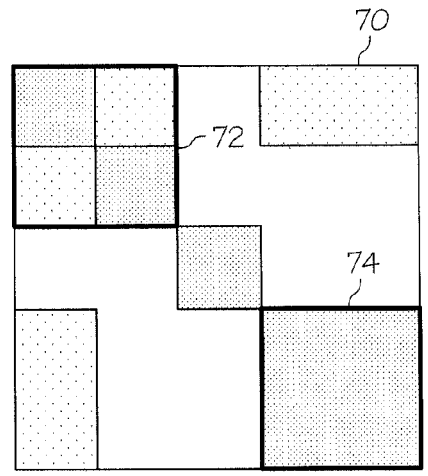
Figure 4E:
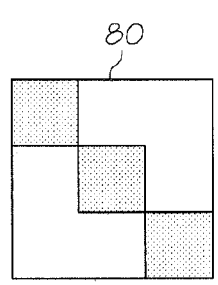
Figure 5:
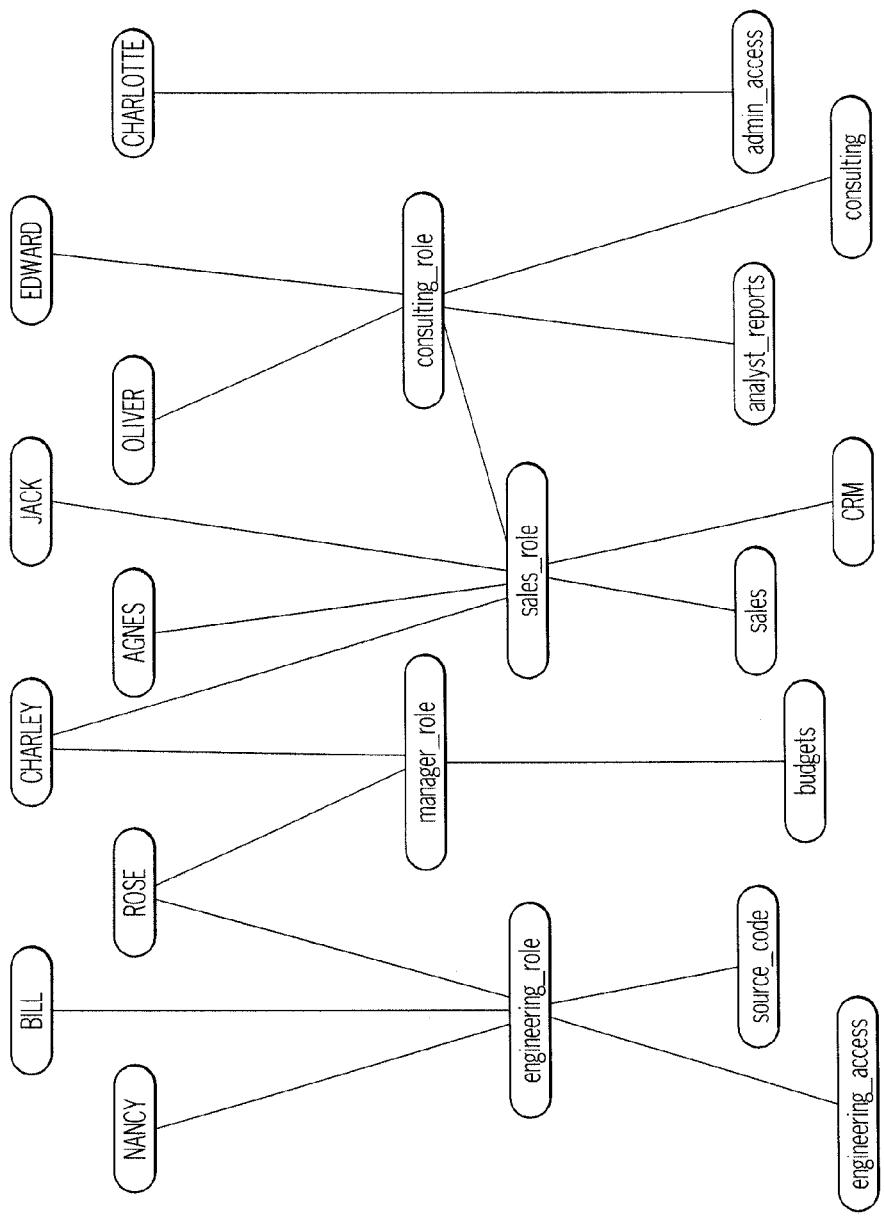
FIG. 5 illustrates a hierarchical role model generated according to one embodiment of the present disclosure.

The final iteration of the method generates the cluster image 80 seen in FIG. 4E (FIG. 1, box 14). At this point, there is only one person associated with a single access control permission. Therefore, the role engineer determines that no further roles are needed, and the process ends (FIG. 1, boxes 16, 28). The role model created may then be passed to an enterprise workflow engine for approval. FIG. 5 illustrates the role models defined by the role engineering process in this example.

Figure 6:
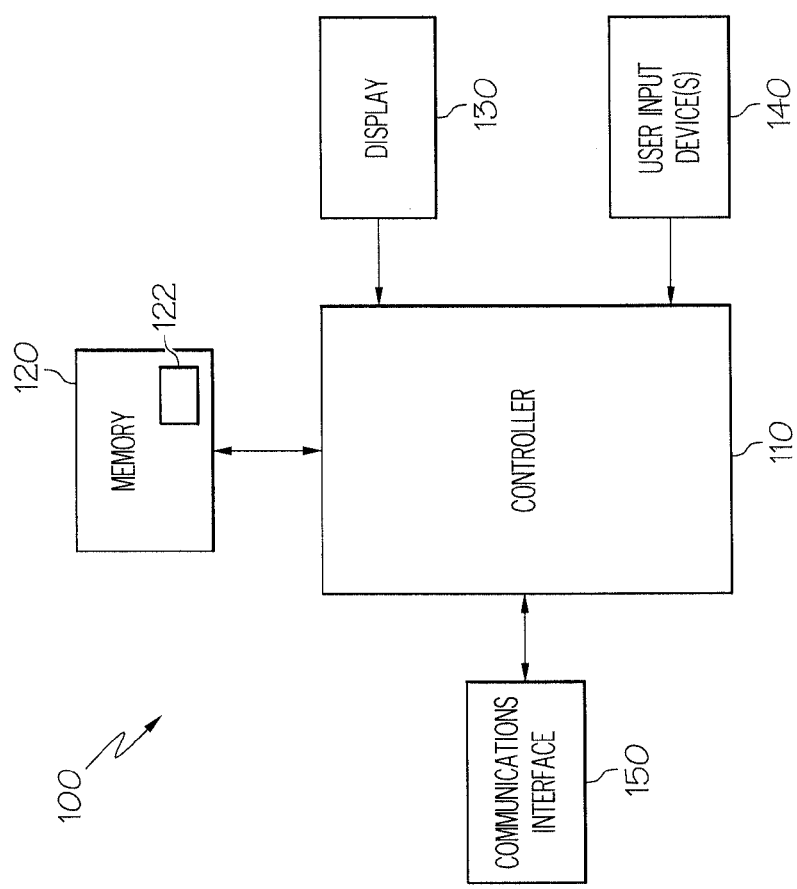
FIG. 6 is a block diagram illustrating some component parts of a computing device configured to perform the method of the present disclosure according to one or more embodiments.

FIG. 6 is a functional block diagram illustrating some components of an exemplary computing device 100, such as a workstation, for example, configured to implement the visual role engineering method of the present disclosure. Although FIG. 6 and the following description are in terms of a single workstation, those of ordinary skill in the art will appreciate that the method 10 may be performed on a single computing device, or distributed across multiple computing devices.

As seen in FIG. 6, computing device 100 comprises a programmable controller 110, a memory 120, display 130, user input device(s) 140, and a communication interface 150. Computing device 100 executes any of the well-known operating systems such as MS-DOS, PC-DOS, OS-2, MAC-OS, MICROSOFT WINDOWS, UNIX, or other appropriate operating system.

The programmable controller 110 may be implemented by one or more microprocessors, hardware, firmware, or a combination thereof, and generally controls the operation and functions of the computing device 110 according to programs and instructions 122 stored in memory 120. Such operations and functions include, but are not limited to, communicating with network servers (not shown) or other such devices.

The memory 120 may comprise volatile memory, such as random access memory (RAM), non-volatile memory, such as EPROM, EEPROM, and/or flash memory, or a combination of volatile and non-volatile memory. Memory 120 may be implemented as discrete devices, stacked devices, or integrated with processor 110. Also, memory may include magnetic storage devices and optical storage devices. Memory 120 may be removable, or fixed.

The display 130 and user input device(s) 140 provide a user interface for the role engineer to interact with the computing device 100. The display 130 outputs the cluster images and other information for viewing by the role engineer, while the user input device(s) 140 enables the role engineer to input data and commands to control the computing device 100, and to make selections. The display 130 may, for example, comprise a liquid crystal display (LCD), plasma screen, light emitting diode (LED) display, or touch screen display that also serves as a user input device 140. The user input device(s) 140 may comprise any type of device for inputting data and commands, such as a keyboard, pointing device (e.g., mouse, joystick, track ball), pressure sensitive input device (e.g., touch pad), or voice activated control.

The communications interface 150 comprises a transceiver or other communications interface that facilitates communications with one or more network servers via an IP network such as the Internet. The memory 120 may comprise any non-transitory, solid state memory or computer readable media known in the art. Suitable examples of such media include, but are not limited to, ROM, DRAM, Flash, or a device capable of reading computer-readable media, such as optical or magnetic media, or any of the additional storage mediums discussed above.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer implemented method comprising:
obtaining, by a computing device, a user list comprising a plurality of users and corresponding permission sets held by the plurality of users and not assigned to an existing role; and
iteratively defining roles for the plurality of users, wherein iteratively defining the roles comprises the computing device:
generating, from data in the user list, a matrix representation of similarities between the permissions sets for the plurality of users in the user list;
generating, from the matrix representation of similarities, a cluster image for display to the user graphically indicating the similarities between the permissions sets of the plurality of users in the user list, wherein the cluster image comprises a cluster graphically representing a subset of users with at least one common permission;
selecting the cluster corresponding to the subset of the users in the user list;
creating a role for the subset of users represented by the selected cluster;
assigning a permission shared by at least two users in the subset of users to the role;
assigning the role to the subset of users represented by the selected cluster; and
updating the user list for a subsequent iteration, wherein updating the user list comprises removing the permission assigned to the role from the permission sets of the subset of users represented by the selected cluster.

2. The computer implemented method of claim 1 wherein generating a cluster image that depicts cluster tendencies of the plurality of users in the user list comprises
comparing the permission sets of the plurality of users in the user list to determine the similarities between the permission sets.

3. The computer implemented method of claim 1 wherein creating a role for the subset of users represented by the selected cluster and assigning a permission shared by at least two users in the subset of users to the role comprises assigning a permission shared by all users in the subset of users to the role.

4. The computer implemented method of claim 1 wherein creating a role for the subset of users represented by the selected cluster and assigning a permission shared by at least two users in the subset of users to the role comprises assigning a permission shared by a specified percentage of users in the subset of users to the role.

5. The computer implemented method of claim 1 wherein updating the user list for a subsequent iteration further comprises removing any users with empty permission sets from the user list.

6. The computer implemented method of claim 1 wherein updating the user list for a subsequent iteration further comprises adding the created role to the user list.

7. The computer implemented method of claim 6 further comprising the computing device creating a hierarchical role model, wherein creating the hierarchical role model comprises assigning a role created in a previous iteration to a role created in a current iteration.

8. The computer implemented method of claim 7 wherein updating the user list for a subsequent iteration further comprises removing each user with an empty permission set and each user that is assigned a single role from the user list.

9. A computing device comprising:
a display;
a user input device; and
a processing circuit configured to:
obtain a user list comprising a plurality of users and corresponding permission sets held by the plurality of users and not assigned to an existing role; and
iteratively define roles for the plurality of users, wherein to iteratively define the roles, the processing circuit is configured to:
generate, from data in the user list, a matrix representation of similarities between the permissions sets for the plurality of users in the user list;
generate, from the matrix representation of similarities, a cluster image for display to the user graphically indicating the similarities between the permissions sets of the plurality of users in the user list, wherein the cluster image comprises a cluster graphically representing a subset of users with at least one common permission;
receive user input indicating a selected cluster corresponding to the subset of users;
create a role for the subset of users represented by the selected cluster;
assign a permission shared by at least two users in the subset of users to the role;
assign the role to the subset of users represented by the selected cluster; and
update the user list for a subsequent iteration, wherein to update the user list the controller removes the permission assigned to the role from the permission sets of the subset of users represented by the selected cluster.

10. The computing device of claim 9 wherein to generate a cluster image graphically indicating similarities between the permissions sets of the plurality of users in the user list, the processing circuit is further configured to
compare the permission sets of the plurality of users in the user list to determine the similarities between the permission sets.

11. The computing device of claim 9 wherein the processing circuit is further configured to assign a permission that is shared by all users in the subset of users to the role.

12. The computing device of claim 9 wherein the processing circuit is further configured to assign a permission that is shared by a specified percentage users in the subset to the role when it assigns permissions to the role.

13. The computing device of claim 9 wherein the processing circuit is further configured to remove any users with empty permission sets from the user list when updating the user list.

14. The computing device of claim 9 wherein the processing circuit is further configured to add the created role to the user list when updating the user list.

15. The computing device of claim 14 wherein to create a hierarchical role model, the processing circuit is further configured to assign a role created in a prior iteration to a role created in a current iteration.

16. The computing device of claim 15 wherein the processing circuit is further configured to remove each user with an empty permission set and each user that is assigned a single role when updating the user list.

17. A computer readable storage medium comprising computer readable program code stored thereon that, when executed by a processing circuit of a computing device, configures the computing device to:
obtain a user list comprising a plurality of users and corresponding permission sets held by the plurality of users and not assigned to an existing role; and
iteratively define roles for the plurality of users, wherein to iteratively define the roles the computer readable program code configures the processing circuit to:
generate, from data in the user list, a matrix representation of similarities between the permissions sets for the plurality of users in the user list;
generate, from the matrix representation of similarities, a cluster image for display to a user graphically indicating the similarities between the permissions sets of the plurality of users in the user list, wherein the cluster image comprises a cluster representing a subset of users with at least one common permission;
receive user input indicating a selected cluster corresponding to the subset of users;
create a role for the subset of users represented by the selected cluster;
assign a permission shared by at least two users in the subset of users to the role;
assign the role to the subset of users represented by the selected cluster; and
update the user list for a subsequent iteration, wherein to update the user list the controller removes the permission assigned to the role from the permission sets of the subset of users represented by the selected cluster.

18. The computer readable storage medium of claim 17 wherein to generate a cluster image graphically indicating similarities between the permissions sets of the plurality of users in the user list, the computer readable program code further configures the processing circuit to;
compare the permission sets of the plurality of users in the user list to determine the similarities between the permission sets.

19. The computer readable storage medium of claim 17 wherein the computer readable program code further configures the processing circuit to add the created role to the user list when updating the user list.

20. The computer readable storage medium of claim 17 wherein the computer readable program code further configures the processing circuit to assign a role created in a prior iteration to a role created in a current iteration.

* * * * *